(12) United States Patent
Shalev et al.

(10) Patent No.: US 10,742,555 B1
(45) Date of Patent: Aug. 11, 2020

(54) NETWORK CONGESTION DETECTION AND RESOLUTION

(71) Applicant: Amazon Technologies, Inc., Seattle, WA (US)

(72) Inventors: Leah Shalev, Zichron Yaakov (IL); Ron Diamant, Albany, CA (US); Erez Izenberg, Tel Aviv (IL); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 235 days.

(21) Appl. No.: 15/838,245

(22) Filed: Dec. 11, 2017

(51) Int. Cl.
*H04L 12/803* (2013.01)
*H04L 12/26* (2006.01)
*H04L 29/06* (2006.01)
*H04L 12/721* (2013.01)
*H04L 12/743* (2013.01)
*H04L 12/707* (2013.01)
*H04J 3/06* (2006.01)

(52) U.S. Cl.
CPC ......... *H04L 47/122* (2013.01); *H04J 3/0697* (2013.01); *H04L 43/0864* (2013.01); *H04L 43/106* (2013.01); *H04L 43/16* (2013.01); *H04L 45/22* (2013.01); *H04L 45/26* (2013.01); *H04L 45/7453* (2013.01); *H04L 63/0428* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 6,590,869 | B1* | 7/2003 | Beyda | H04M 7/0057 370/248 |
| 9,094,856 | B1* | 7/2015 | Tian | H04B 7/18513 |
| 2005/0220027 | A1* | 10/2005 | Setton | H04L 12/1877 370/241 |

(Continued)

OTHER PUBLICATIONS

SAN Design and Best Practices . White Paper. [online] Brocade Communications Systems, Inc., 2015 [retrieved on Dec. 11, 2017]. Retrieved from the Internet: <URL: http://www.brocade.com/content/dam/common/documents/content-types/whitepaper/brocade-san-design-best-practices-wp.pdf >, 96 pages.

*Primary Examiner* — Jeffrey M Rutkowski
*Assistant Examiner* — Ning Li
(74) *Attorney, Agent, or Firm* — Kilpatrick Townsend & Stockton LLP

(57) ABSTRACT

A method and corresponding apparatus for detecting network congestion. The method includes capturing, using a local clock of a sender device, a send time of an outgoing packet sent from the sender device to a receiver device through a forward route, and capturing, using the local clock of the sender device, a receive time of an acknowledgment packet sent from the receiver device to the sender device through a backward route. The acknowledgment packet contains timing information, generated using a local clock of the receiver device, for determining an internal latency of the receiver device. A round trip time is computed as a difference between the send time and the receive time. The internal latency is subtracted from the round trip time to compute a total propagation time. If the total propagation time is above a threshold, the forward route and the backward route are changed.

20 Claims, 10 Drawing Sheets

(56) References Cited

U.S. PATENT DOCUMENTS

| | | | |
|---|---|---|---|
| 2009/0201805 A1* | 8/2009 | Begen | H04L 1/0009 |
| | | | 370/225 |
| 2011/0269478 A1* | 11/2011 | Das | G01S 5/14 |
| | | | 455/456.1 |
| 2013/0312082 A1* | 11/2013 | Izu | H04L 9/0891 |
| | | | 726/13 |
| 2014/0043992 A1* | 2/2014 | Le Pallec | H04L 43/10 |
| | | | 370/252 |
| 2015/0294562 A1* | 10/2015 | Tian | H04L 43/12 |
| | | | 340/870.28 |
| 2015/0365338 A1* | 12/2015 | Pannell | H04J 3/0635 |
| | | | 370/412 |
| 2016/0020969 A1* | 1/2016 | Vasseur | H04L 43/062 |
| | | | 370/252 |
| 2017/0093670 A1* | 3/2017 | Dinan | H04L 69/40 |
| 2017/0134271 A1* | 5/2017 | Kohiga | H04L 12/6418 |
| 2017/0163509 A1* | 6/2017 | Li | H04L 43/0864 |
| 2019/0149398 A1* | 5/2019 | Shaw | H04L 41/0695 |
| | | | 370/244 |

* cited by examiner

NETWORK CONGESTION DETECTION AND RESOLUTION

BACKGROUND

Computer networks often experience congestion. When congestion is concentrated at a specific point in the network, that point is commonly referred to as a bottleneck. There are two main types of bottlenecks: traffic-based and frame-based. Traffic-based congestion occurs when the throughput capacity of a link between two nodes (e.g., two servers) is reached or exceeded. For example, a 10 Gigabit Ethernet link may not be able to handle more than 10 Gigabits per second. Frame-based bottlenecks occur when a node cannot handle data that is supposed to pass through the node. This can happen for various reasons. For example, the node may have crashed so that it no longer accepts traffic from a switch, causing data to be queued inside the switch rather than being released towards an intended destination. Another example is when the node prioritizes certain data in its queue so that fewer transmission resources are available for other data to be sent through the node. Bottlenecks can be hard to predict, especially frame-based bottlenecks.

BRIEF DESCRIPTION OF THE DRAWINGS

Various embodiments in accordance with the present disclosure will be described with reference to the drawings, in which.

DETAILED DESCRIPTION

Figure 1:
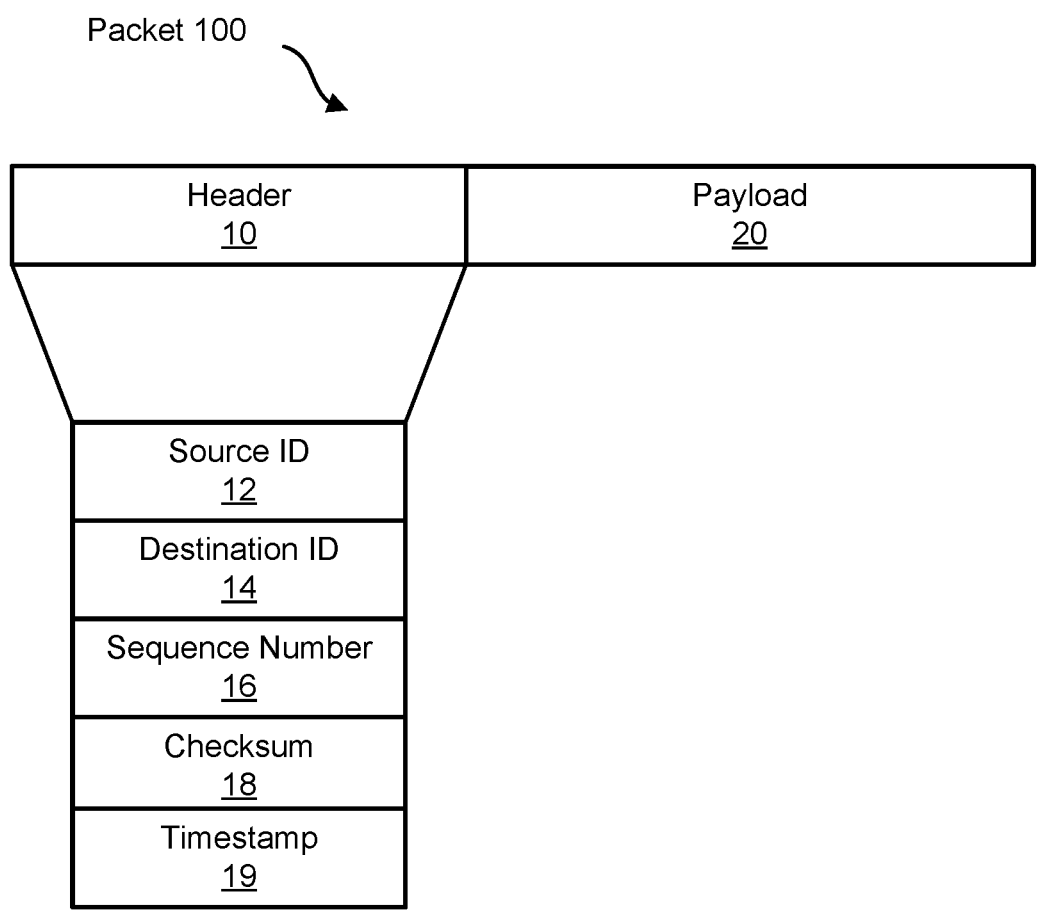
FIG. 1 illustrates an example packet format.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Because network congestion can be hard to predict, congestion is usually handled by detecting bottlenecks as they occur. One way to detect congestion is at a switch. Although switches can be replaced or upgraded to include congestion detection capabilities, doing so can be costly or inconvenient. For example, the switch may need to be taken offline, affecting the ability of nodes connected to the switch to communicate. Additionally, detection at the switch does not adequately address congestion in the network as a whole; a switch can monitor traffic that passes through itself, but not traffic in other parts of the network.

Example embodiments are directed to an improved way of detecting congestion. The detection includes capturing send times and receive times using local clocks of a sender node and a receiver node, and computing a total propagation time for a packet and its corresponding acknowledgment packet. The total propagation time is computed taking into account an internal latency of the receiver, with the internal latency being communicated to the sender through timing information included in the acknowledgment packet. Thus, the total propagation time is an accurate representation of the amount of time needed to transmit the packet and the acknowledgment packet and may include, for example, a delay caused by a frame-based bottleneck at an intermediate node, an internal latency of the intermediate node, or other processing overhead that contributes to congestion between the sender and receiver. Congestion can be detected when the total propagation time is above a threshold, and can be handled by changing to a different route for transmission of subsequent packets between the sender and the receiver. Thus, the embodiments can be implemented without requiring modification of existing switching infrastructure. In particular, congestion handling capabilities can be implemented in the nodes themselves and deployed on a rolling basis, for example through software or firmware updates, or by gradually replacing individual nodes. Disruption of network traffic is therefore minimized. Additionally, since nodes tend to be replaced more frequently than switches, the cost of implementing the congestion detection techniques described in this disclosure can be lower compared to switch based solutions.

Example embodiments are described in which network congestion is detected based on transmission of data in the form of packets. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction.

FIG. 1 illustrates a packet 100 that is formatted to include a header 10 and a payload 20. The exact format of a packet will vary depending on the network transmission protocol. For example, a packet sent using Transmission Control Protocol (TCP) will be formatted differently from a packet sent using User Datagram Protocol (UDP). The packet 100 is therefore a non-limiting example of how data can be organized for transmission. The header 10 includes various items of metadata associated with the data in the packet. For example, the header 10 may include a source identifier 12, a destination identifier 14, a sequence number 16, a checksum 18, and a timestamp 19. The source identifier 12 and the destination identifier 14 respectively indicate the source and destination of the packet 100, and may be formatted as Internet Protocol (IP) addresses. The sequence number 16 indicates an order in which the packet is to be transmitted in relation to other packets from the same sender. The payload 20 contains the data to be transmitted, and the checksum 18 provides a verification mechanism for the data. A recipient of the packet 100 may compute a corresponding checksum upon receipt of the packet 100 and compare the computed checksum to the checksum 18 to determine whether the packet 100 was transmitted correctly. The timestamp 19 indicates a time at which the packet 100 was transmitted, e.g., from a sender to a receiver or from a receiver in reply to a packet from a sender.

Figure 2:
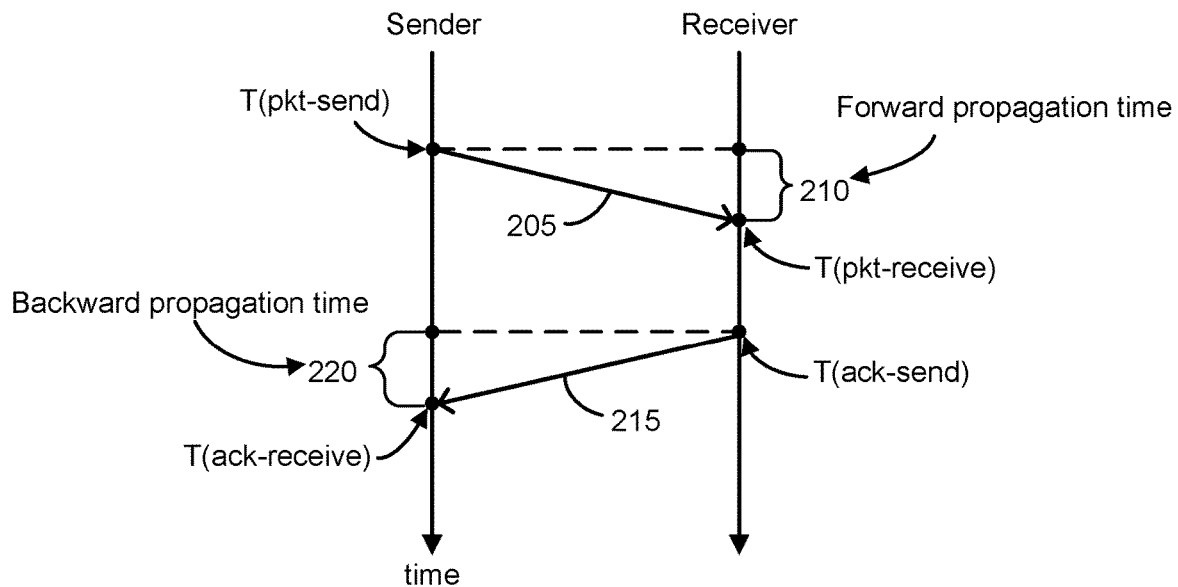
FIGS. 2 and 3 illustrate example timing measurements.

FIG. 2 is a timing diagram illustrating example timing measurements, according to certain aspects of this disclosure. FIG. 2 shows a packet 205 transmitted from a sender device to a receiver device. In response to the packet 205, the receiver transmits an acknowledgment packet 215 to the sender. In the forward direction, the packet 205 is sent through a first route that includes a router that forwards the packet 205 to the receiver. Similarly, in the backward direction, the packet 215 is sent through a second route that includes a router that forwards the packet 215 to the sender. The first route can be different from the second route, but in some instances the routes can be identical. Each of these routes may include one or more physical links and possibly one or more intermediate nodes between the sender and the receiver. For example, when the forward and backward routes are different, the packet 205 may pass through a first router and one or more additional network devices (e.g., a switch) before reaching the receiver, while the packet 215 passes through a second router and one or more additional network devices before reaching the sender.

In order to detect congestion between the sender and the receiver, information describing certain time points during the transmissions of the packets 205 and 215 can be acquired. These time points include the send time of the packet 205, T(pkt-send), the receive time of the packet 205, T(pkt-receive), the send time of the acknowledgment packet 215, T(ack-send), and the receive time of the packet 215, T(ack-receive). For accurate timing measurement, the send times should ideally be captured as close as possible to the moment when the packets leave their transmitting devices. For example, if the packets are transmitted through a wired connection, T(pkt-send) should be captured just before the packet 205 is sent to the wire. Similarly, the receive times should be captured as close as possible to the moment when the packets arrive at their receiving devices. For example, if the packets are transmitted wirelessly, T(ack-receive) should be captured just after the packet 215 arrives at an antenna of the sender. As described below in connection with various example embodiments, the capturing of these time points, as well as detection of congestion based on the time points, can be performed by a network interface controller or other network device associated with the sender or receiver.

If T(pkt-send) and T(pk-receive) are known, then a forward propagation time 210 can be computed as a difference between these two values. The forward propagation time 210 indicates how long it took for the packet 205 to arrive at the receiver. Similarly, if T(ack-send) and T(ack-receive) are known, then a backward propagation time 220 can be computed as a difference between these two values. The backward propagation time 220 indicates how long it took for the packet 215 to arrive at the sender. Both propagation times 210 and 220 are indicators of the degree of congestion over a route between the sender and the receiver. If either propagation time 210 and 220 is longer than expected, this would indicate that there is congestion. Further, if one of the propagation times is significantly longer than the other, this would indicate that traffic is worse in one direction. Corrective action could then be taken by the sender and/or the receiver to mitigate the congestion by, for example, switching to a different route for transmission of subsequent packets between the sender and the receiver.

The timing measurements in FIG. 2 are dependent upon the ability of the sender and the receiver to accurately capture the time points. In particular, a clock of the sender should be synchronized to a clock of the receiver so that there is a shared time reference by which the time points are captured. If the clocks produce periodic clock signals, the clock signals should be aligned with respect to both frequency and phase. Each of the propagation times is dependent on a time captured by the sender as well as a time captured by the receiver. If the clocks are unsynchronized, then the propagation times may not be computed correctly. Synchronization is generally not an issue in a simple network, for example, with only one sender and one receiver. In a complex network with multiple senders and multiple receivers, it may be challenging to synchronize the clocks of all the network devices.

Figure 3:
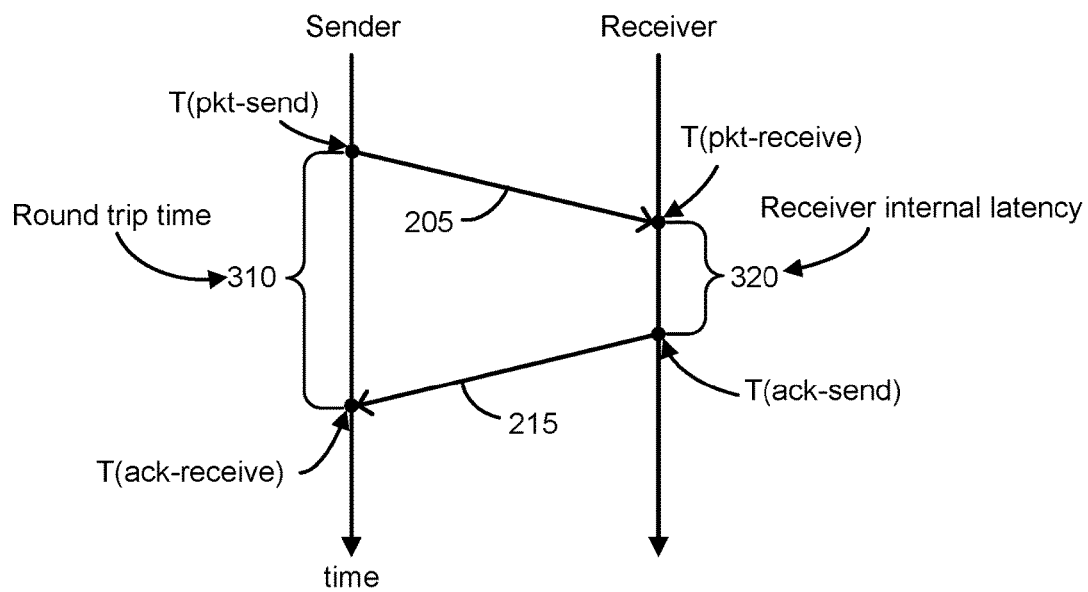

FIG. 3 is another timing diagram illustrating example timing measurements, according to certain aspects of this disclosure. The measurements in FIG. 3 represent an alternative way to detect congestion without a need for synchronizing the clocks of the sender and the receiver, and are based on the same time points as FIG. 2. In contrast to FIG. 2, however, the timing measurements are computed based on time points that are necessarily captured by the same reference clock. One of the measurements is a round trip time (RTT) 310, the other measurement is a receiver internal latency 320. The RTT 310 indicates how long it took between sending the packet 205 and receiving the acknowledgment packet 215, and is computed as a difference between T(pkt-send) and T(ack-receive). Because both components of the RTT 310 are captured by the sender, they are generated using the same clock, e.g., an internal or local clock of the sender. Similarly, the receiver internal latency 320 is computed using a clock associated with the receiver, as a difference between T(pkt-receive) and T(ack-send). Accordingly, the sender clock does not need to be synchronized to the receiver block. For example, the sender clock and the receiver clock can operate at different frequencies. The receiver internal latency 320 indicates the amount of time needed for the receiver to prepare and send the packet 215 in response to receiving the packet 205. The internal latency corresponds to processing time in the receiver and includes, for example, an amount of time spent processing the packet 205 and an amount of time that the packet 215 spent in a queue prior to being transmitted.

If the RTT 310 and the receiver internal latency 320 are known, then a total propagation time can be computed by subtracting the receiver internal latency 320 from the RTT 310. This total propagation time is a measure of the combined amount of time spent in-flight for the packet 205 and the packet 215. Internal latency is often of the same magnitude, if not higher, than the latency through the forward and backward routes that connect the sender and the receiver. That may be because after the receiver decides to send the packet 215, the packet enters a queue with a large number of other packets that have a higher priority than the packet 215. The receiver may also have multiple queues from which packets are selected for transmission. Because it excludes the receiver internal latency, the total propagation time is an accurate metric for assessing congestion between the sender and the receiver.

Timing measurements can be performed using software, hardware, or a combination of software and hardware. In one implementation, timing measurements are computed using time points captured with the aid of hardware modules that are integrated into the nodes to efficiently and quickly capture the time points. In particular, the hardware modules can be integrated into a network interface module, also referred to herein as a network interface controller (NIC), to capture the time points close to the actual time of sending or receiving the packets. From the discussion of FIGS. 2 and 3 above, it should be apparent that a mechanism for communicating timing measurements between nodes would facilitate congestion detection. Example modules for capturing time points, computing timing measurements based on the captured time points, and communicating these measurements will now be described.

Figure 4:
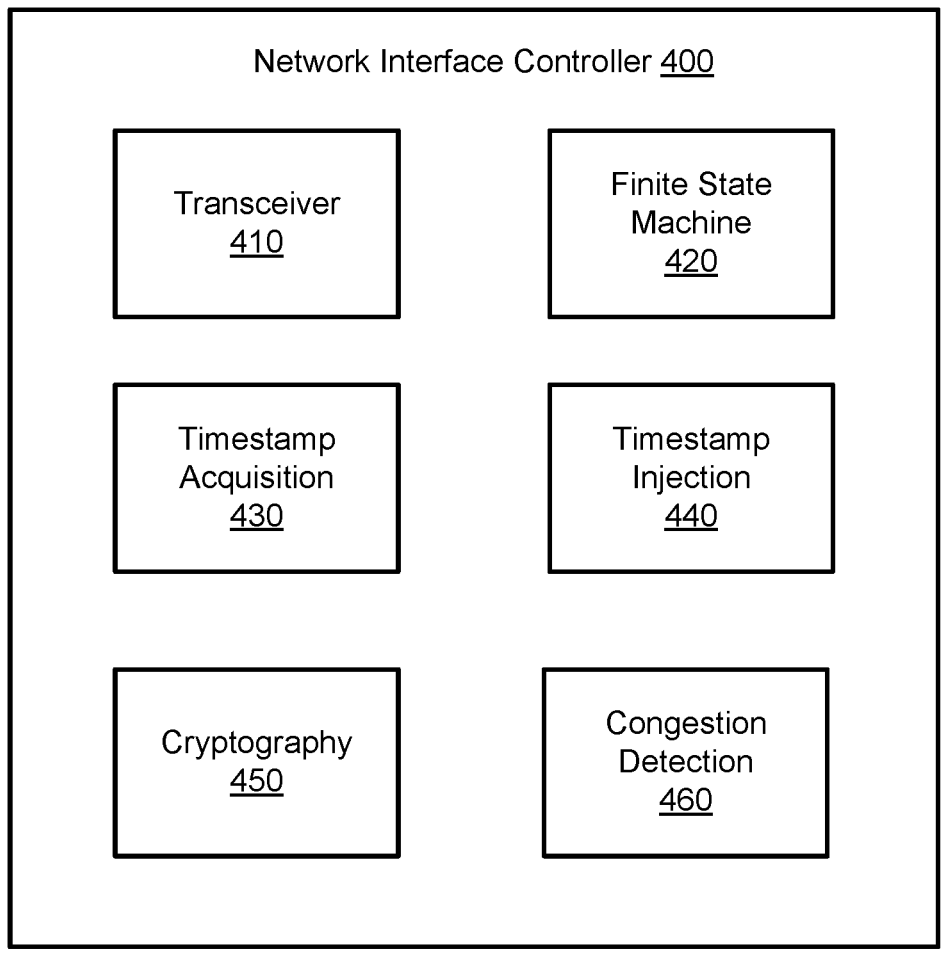
FIG. 4 illustrates an example network interface controller.

FIG. 4 illustrates a NIC 400 including a transceiver module 410, a finite state machine (FSM) 420, a timestamp acquisition module 430, a timestamp injection module 440, a cryptography module 450, and a congestion detection module 460. Each of the modules in the NIC 400 may include processing logic such as one or more processors, integrated circuits, a System on a Chip (SoC), and other example processing logic described below in connection with FIG. 10. In some implementations, the NIC modules share resources, including processing logic and memory. The transceiver module 410 transmits and receives packets on behalf of a network device to which the NIC 400 is associated. The network device can be a physical device or a virtual machine. The transceiver module 410 includes circuitry for sending and receiving data according to a transmission protocol.

The FSM 420 controls the operation of the timestamp injection module 440 by switching between various states, each state corresponding to a particular combination of input signals supplied by the FSM 420 to the timestamp injection module 440. For example, as explained later in connection with the example timestamp injection module of FIG. 6, the FSM 420 may include a first state in which the timestamp injection module forms a header of an outgoing packet using the header of an incoming packet, and a second state in which the timestamp injection module forms a timestamp portion of the outgoing packet using a timestamp embedded in the incoming packet, a metadata timestamp supplied by a timestamp acquisition module, or a timestamp computed using the embedded timestamp and the metadata timestamp. The FSM 420 may further include a third state in which the timestamp injection module forms a data (payload) portion of the outgoing packet using a data portion of the incoming packet.

The timestamp acquisition module 430 captures timestamps for packets transmitted or received by the network device. In particular, the module 430 operates to capture timestamps corresponding to the four time points described earlier in connection with FIGS. 2 and 3.

The timestamp injection module 440 injects a timestamp into an incoming packet to form an outgoing packet containing the injected timestamp. The timestamp injection module 440 may include circuitry for determining, based on input from the FSM 420, whether to inject an embedded timestamp, a metadata timestamp generated by the timestamp acquisition module 430, a timestamp computed using the embedded and metadata timestamps, or a combination of these timestamps.

The cryptography module 450 encrypts packets for transmission and decrypts received packets for further processing, for example by a software application executed in the network device. The encryption and decryption can be according to a security protocol. The cryptography module 450 may support multiple security protocols and can include a memory storing a shared secret, a public key, a private key, or other data used for encryption and decryption of packets.

The congestion detection module 460 can be implemented in hardware, software, or a combination of both, and analyzes timing information (e.g., timestamps) included in packets to determine whether network congestion exists somewhere between a sender and a receiver. For example, when the network device is operating as the sender, the congestion detection module 460 may compute a total propagation time based on a round trip time and a receiver internal latency. If the total propagation time is indicative of congestion, the congestion detection module 460 may change a network resource, causing a router between the sender and the receiver to change the forward and backward routes that connect the sender to the receiver. As described later in connection with the method of FIG. 8, one way to change the routes is to switch to a different source port.

Figure 5:
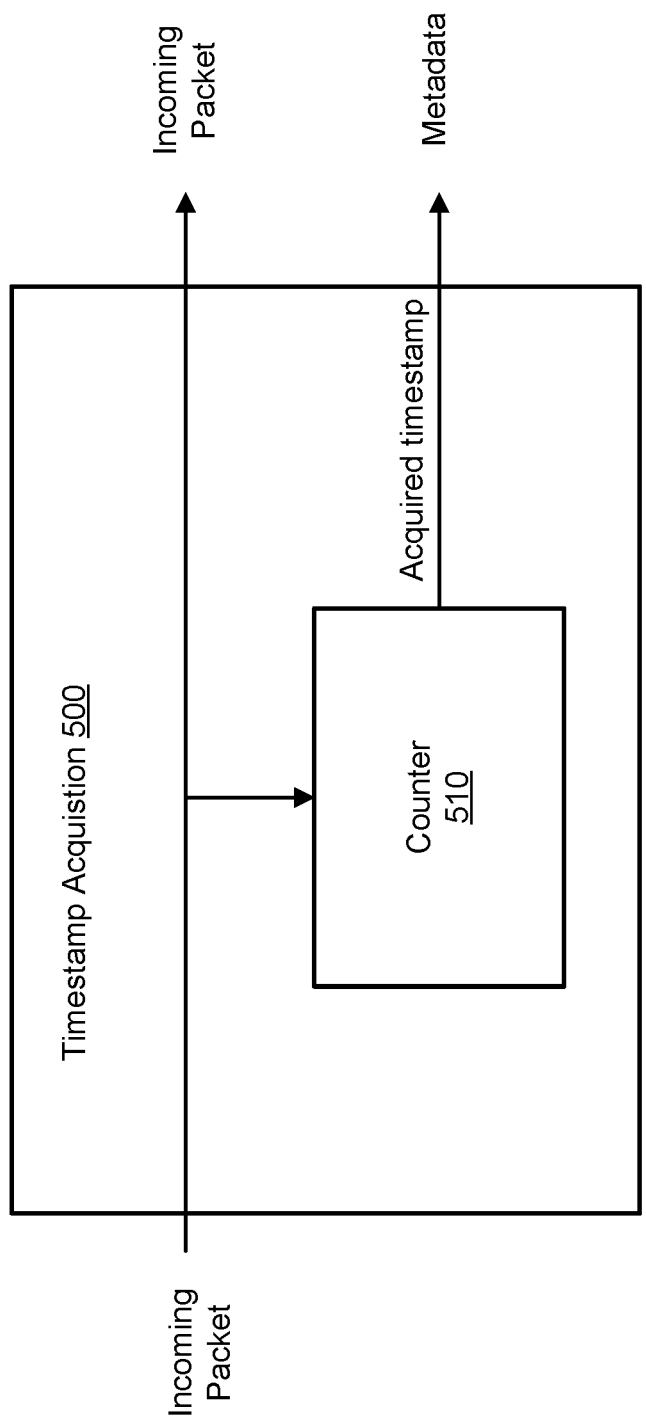
FIG. 5 illustrates an example timestamp acquisition module.

FIG. 5 illustrates a hardware-implemented timestamp acquisition module 500 for capturing a time point associated with an incoming packet. The incoming packet discussed in connection with the timestamp acquisition module 500 is a packet that is input to the module 500. Similarly, the incoming packet in FIG. 6 refers to a packet that is input to a timestamp injection module 600. The incoming packet can therefore be a packet that is being prepared for transmission or a packet that has been received and is being processed. The acquisition module 500 can be implemented using a free running counter 510 that is automatically incremented at a regular interval. The counter 510 operates as a local clock for a network device associated with the acquisition module 500 and may, for example, count from zero to some maximum supported value and may be reset periodically before reaching the maximum value, for example, at the beginning of every month. Alternatively, the counter 510 may be permitted to rollover back to zero after reaching the maximum value, in which case the counter may not need to be reset. The counter 510 is operable to generate a timestamp in response to each incoming packet. In particular, the counter 510 may output, as the timestamp, a current value of the counter whenever a new packet is input to the acquisition module 500. The timestamp may be output as metadata associated with the incoming packet, for example, output to a metadata bus. In addition to generating a timestamp associated with each incoming packet, the acquisition module 500 may forward the incoming packet unmodified to the timestamp injection module 600 or to some other device in the processing path of the incoming packet.

Figure 6:
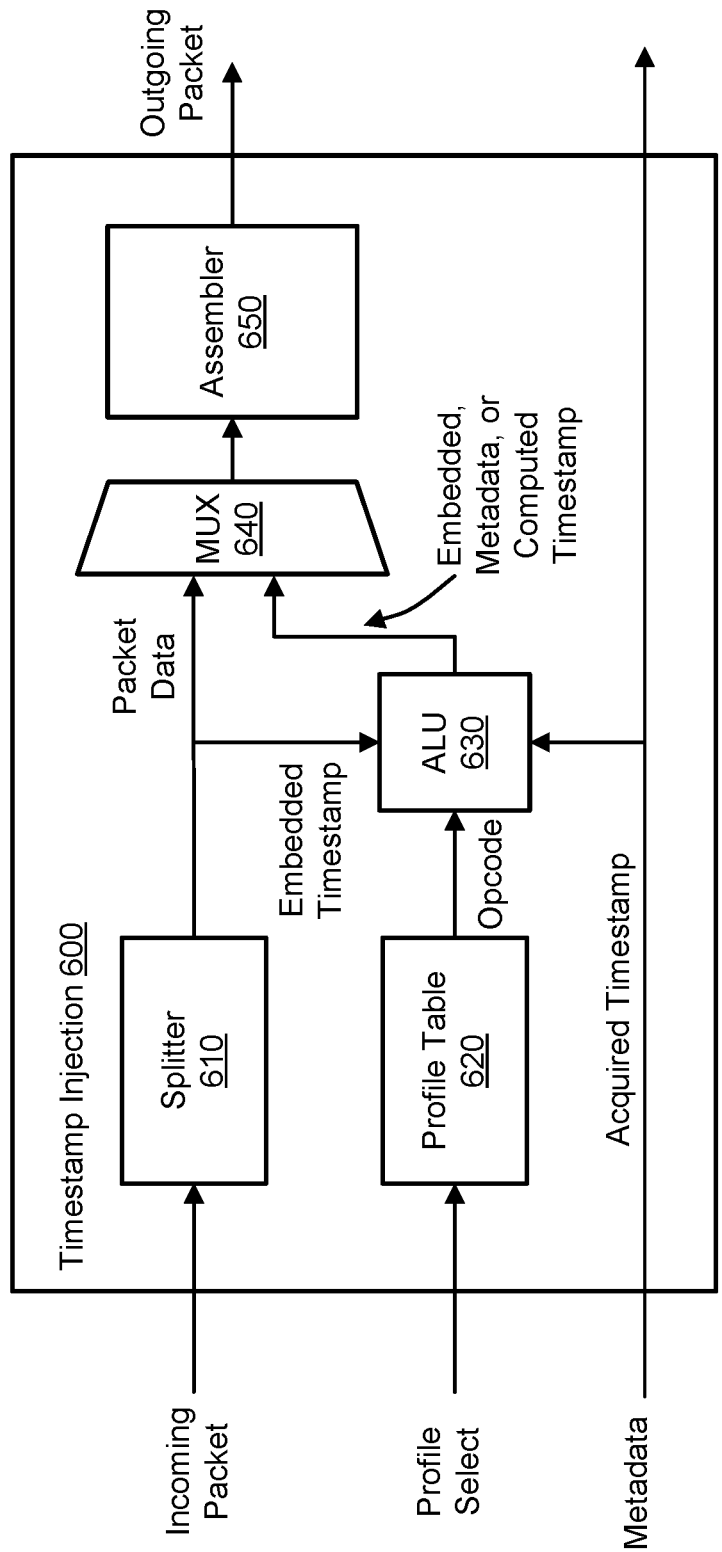
FIG. 6 illustrates an example timestamp injection module.

FIG. 6 illustrates a timestamp injection module 600 for injecting a timestamp into an incoming packet. The timestamp may be generated, for example, using the timestamp acquisition module 500. The injection module 600 includes a packet splitter 610, a profile table 620, an arithmetic logic unit (ALU) 630, a multiplexer (MUX) 640, and a packet assembler 650. The splitter 610 receives an incoming packet of the injection module 600. In some instances, the incoming packet of the injection module 600 can be supplied directly by a timestamp acquisition module, such as acquisition module 500. However, as will be explained in connection with FIGS. 7A and 7B, there may be additional processing steps between timestamp acquisition and timestamp injection, depending on whether the incoming packet is a packet that is being prepared for transmission or a packet that has been received. Therefore, the incoming packet of the injection module 600 may not always be supplied directly by a timestamp acquisition module. The splitter 610 operates to divide the incoming packet into several portions for further processing. One of these portions is a packet header. Another portion corresponds to the data contained in the packet, which the splitter 610 extracts from a packet payload. The splitter 610 may be configured with information specifying the locations of each portion, including which bits of the packet correspond to the payload, and may forward the data contained in those bits to the MUX 640. The configuration information can be supplied to the splitter 610 from an FSM, e.g. the FSM 420, in the form of offset values.

The splitter 610 also extracts a timestamp embedded in the incoming packet. The timestamp can be located in a packet header, e.g., the timestamp 19 in FIG. 1. In some instances, the timestamp is located elsewhere, for example in the packet payload. That is because a standard transmission protocol may not include a provision for the timestamp, in particular for a timestamp computed in accordance with certain aspects of this disclosure. The splitter 610 forwards the embedded timestamp to the ALU 630 for use in computing timing measurements.

The profile table 620 is configured to select an arithmetic operation to be performed by the ALU 630 based on a profile select input. The operation depends on whether the incoming packet is an originally transmitted packet (e.g., packet 205) or an acknowledgment packet (e.g., packet 215), and may further depend on whether the incoming packet is being transmitted or received. The profile table 620 can store a variety of protocol profiles, each corresponding to a specific configuration of the injection module 600. Examples of some protocols appear below in the discussion of FIGS. 8 and 9. The configurations may specify an opcode to be applied to the ALU 630. The profile select input is supplied to the profile table 620 by a hardware or software controller that selects an appropriate protocol for use with a packet depending on whether the network device is operating as a sender or a receiver, and further depending on whether the packet is an originally transmitted packet or an acknowledgment packet. For example, when the incoming packet is being transmitted, software executed by the NIC can select an operation to be performed by the timestamp injection module 600 on the incoming packet. The selected operation can be indicated by metadata that is supplied by the software to the timestamp injection module 600, the metadata being associated with the incoming packet. When the incoming packet is being received, the operation can be selected using a hardware implemented parser in the NIC. The parser analyzes a header of the received packet to determine which operation to apply to the received packet. The header provides the parser with various items of information regarding the packets, such as which transmission protocol was used to transmit the packet (e.g. TCP or UDP). The parser can determine from the header whether the packet is an original packet or an acknowledgment packet. The parser can also determine whether the network device is operating as a sender or a receiver based on whether the packet is an original packet or an acknowledgment packet. For example, if the packet is identified, based on the header, as being an acknowledgment packet and the packet is being transmitted, then that means the network device is operating as a receiver. In some implementations, the same controller operates to produce the profile select input on both the transmit side and the receive side.

The ALU 630 performs operations on several inputs, including the embedded timestamp extracted by the splitter 610 and a timestamp acquired by a timestamp acquisition module. The latter is supplied to the ALU 630 as a metadata timestamp. The operations include passing the embedded or metadata timestamp unmodified to the MUX 640 and various operations that compute a timing measurement from the embedded timestamp and the metadata timestamp. The timing measurements correspond to those described earlier in connection with FIGS. 2 and 3. For example, the ALU 630 can be configured to, when an acknowledgment packet is being transmitted, subtract an embedded timestamp corresponding to T(pkt-receive) from a metadata timestamp corresponding to T(ack-send) to form a timing measurement corresponding to a receiver internal latency. Although the timing measurements correspond to lengths of time rather than time points, for convenience, and because the timing measurements can be injected into packets, such measurements are referred to herein as computed timestamps.

The MUX 640 selects between the output of the splitter 610 and the output of the ALU 630 to sequentially form each bit of an outgoing packet. The selection can be controlled in a similar manner as the splitter 610, e.g., using the FSM 420. The output of the MUX 640 can be controlled through a 1-bit select input (not shown) supplied by the FSM according to the current state of the FSM. For example, when the header of the outgoing packet is being formed, the FSM can be in a first state that configures the splitter 610 with the offset value of the header in the incoming packet and that also configures the select input of the MUX 640 to cause the MUX 640 to select the output of the splitter 610. Then, after the splitter 610 has finished with the header, the FSM can change to a second state that configures the splitter 610 with the offset value of a timestamp section of the incoming packet and that also configures the select input to cause the MUX 640 to select the output of the ALU 630. After the splitter 610 has finished with the timestamp section, the FSM can change to a third state that configures the splitter 610 with the offset value of a payload portion of the incoming packet and that also configures the select input to cause the MUX 640 to select the output of the splitter 610. In this manner, the MUX 640 is configured to form a header and a payload of the outgoing packet by selecting the splitter output, so that the header and the data of the outgoing packet are the same as the incoming packet. The MUX 640 is also configured to form a timestamp of the outgoing packet by selecting the ALU output which, as explained above, can be the embedded timestamp, the metadata timestamp, or a computed timestamp. In some instances, the MUX 640 may inject multiple timestamps into the outgoing packet for use by a sender or receiver in computing a timing measurement for congestion detection purposes. Some of these timestamps may be injected into a payload of the outgoing packet depending, for example, on whether there is sufficient space in the header.

The assembler 650 forms the outgoing packet using the output of the MUX 640. The assembler 650 may reformat the sequential information supplied by the MUX 640 into a transmission protocol compliant format to produce the outgoing packet.

Figure 7B:
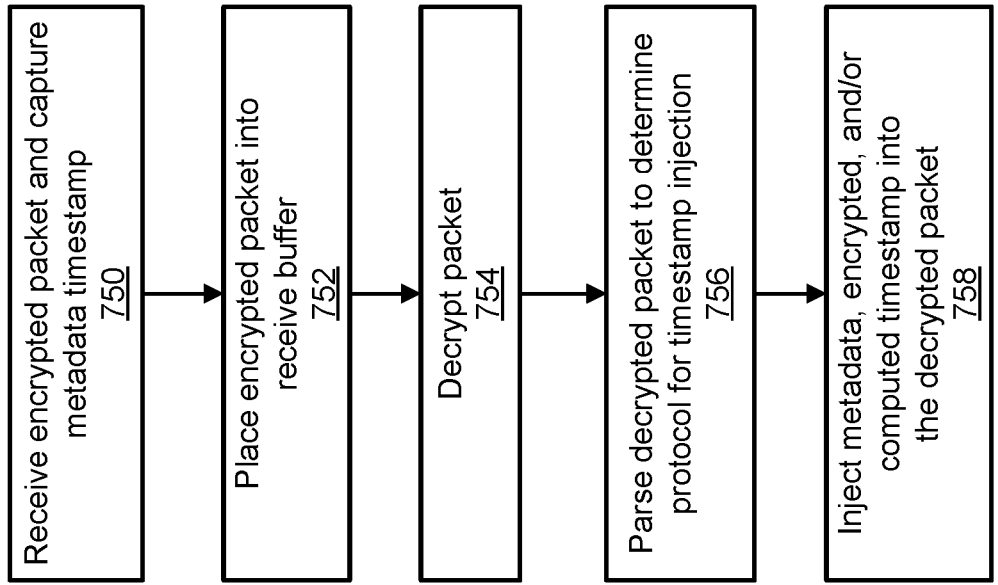
FIG. 7B illustrates an example method for handling received packets.
Figure 7A:
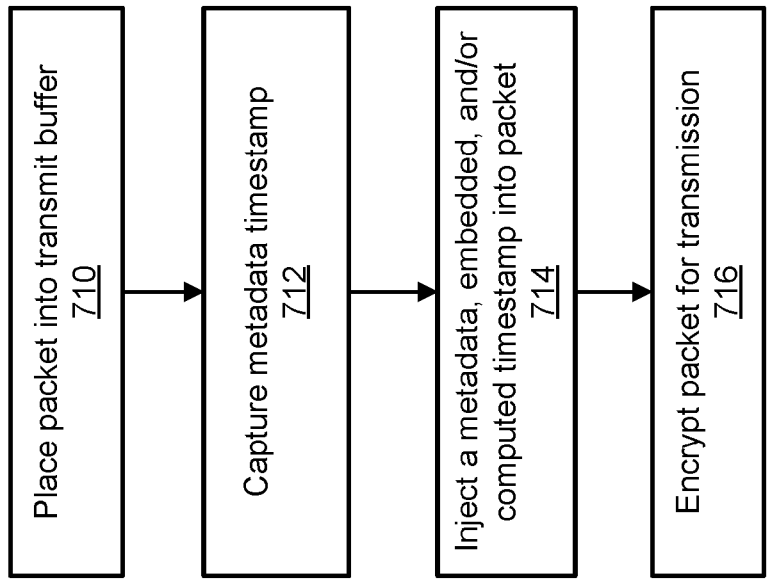
FIG. 7A illustrates an example method for handling packets for transmission.

FIGS. 7A and 7B illustrate example methods for handling packets on the transmit (Tx) side and the receive (Rx) side, respectively. The methods of FIGS. 7A and 7B can be performed on a NIC or other network device implementing congestion detection in accordance with the embodiments described herein. FIGS. 7A and 7B include sequences of steps that can be performed in hardware, software, or a combination of both. In some implementations, one or more of these steps can be performed in a processing pipeline of a network device, for example a pipeline that includes a hardware-implemented timestamp acquisition module and a hardware-implemented timestamp injection module.

FIG. 7A illustrates an example method 700 for handling packets for transmission. At step 710, a packet that is to be transmitted from a sender to a receiver is placed into a transmit buffer. The packet can be supplied, for example, by an application executed by the sender. The transmit buffer may include one or more queues into which the packet is placed. The order in which the packet exits the queue can vary depending, for example, on whether the packet is prioritized over other packets in the queue(s). In one implementation, the transmit buffer is a First-In-First-Out (FIFO) buffer in which packets exit a queue in the same order as the order in which they enter the queue.

At step 712, the packet exits the transmit buffer and a metadata timestamp is captured for the packet, for example using a timestamp acquisition module. Since the packet is being transmitted, the metadata timestamp corresponds to a send time.

At step 714, a timestamp is injected into the packet, for example using a timestamp injection module, to form an outgoing packet for further processing prior to transmission. As explained earlier, the injected timestamp can be an embedded timestamp, a metadata timestamp (e.g., the send time captured in step 712), a timestamp computed using embedded and metadata timestamps, or a combination of these timestamps.

At step 716, the packet is encrypted in accordance with an encryption protocol to form an encrypted packet for output to a transmission medium. The injected timestamp is encrypted along with the rest of the packet's contents. As explained earlier, it is desirable to timestamp packets as close as possible to the time at which the packets arrive or are sent out. Accordingly, encryption may be the final step before the packet gets transmitted. Step 716 is preferably performed after the timestamp injection in step 714 because it may not be desirable, for security reasons, to inject an unencrypted timestamp into a packet being transmitted.

FIG. 7B illustrates an example method 720 for handling received packets. At step 750, an encrypted packet has been received and a metadata timestamp is captured for the encrypted packet. In this instance, since the packet is received, the metadata timestamp corresponds to a receive time. Step 750 may be the first processing step that occurs in connection with the received packet. In this way, the timestamp is acquired as close as possible to a time of arrival.

At step 752, the encrypted packet is placed into a receive buffer, which can implemented in a similar fashion to the transmit buffer described in connection with FIG. 7A, e.g. a FIFO buffer.

At step 754, the encrypted packet exits the receive buffer and is decrypted to form a decrypted packet using a protocol corresponding to the protocol with which the packet was encrypted.

At step 756, the decrypted packet is parsed, for example using a hardware-implemented parser that analyzes a header of the decrypted packet, to determine an appropriate protocol for timestamp injection.

At step 758, the decrypted packet is injected with a metadata timestamp (e.g., the receive time captured in step 750), a timestamp computed using embedded and metadata timestamps, or combination of these timestamps. After step 750 is completed, the decrypted packet is ready for further processing, for example congestion detection based on timestamps in the decrypted packet (in the case of a received acknowledgment packet) or preparation of a corresponding acknowledgment packet (in the case of a received original packet).

Figure 8:
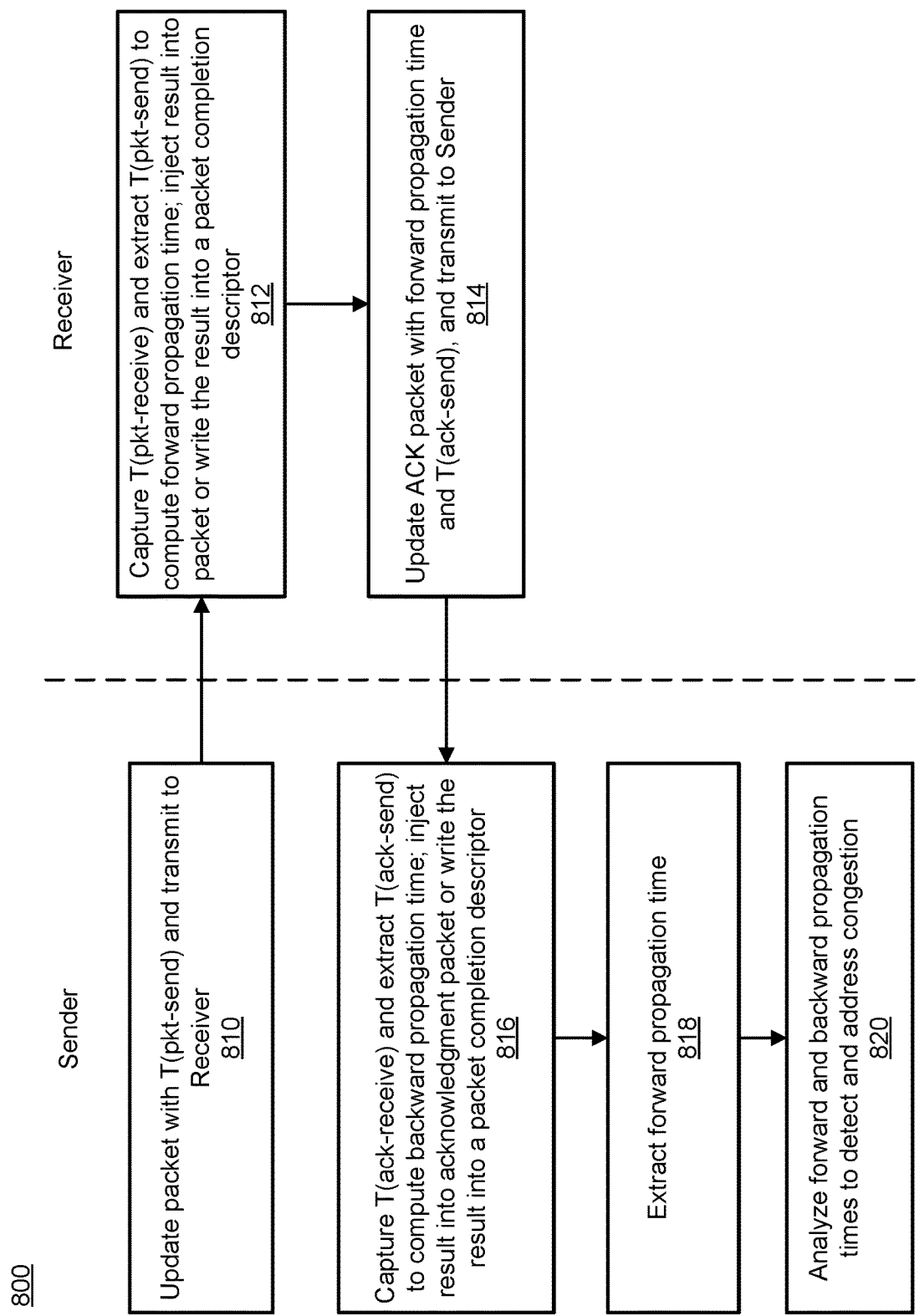
FIGS. 8 and 9 illustrate example methods for detecting network congestion.
Figure 9:
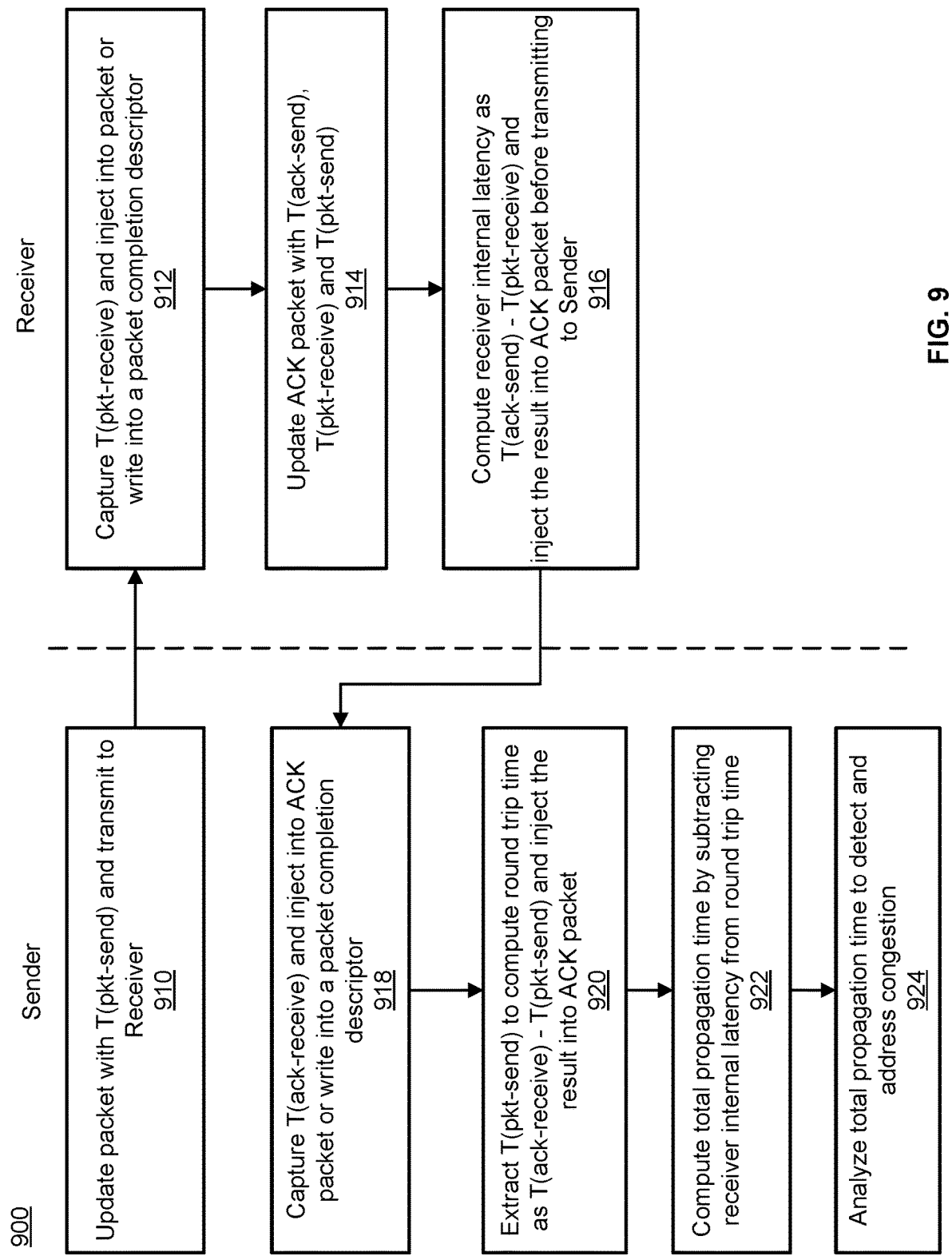

FIGS. 8 and 9 illustrate examples of methods for detecting network congestion. These methods may be implemented by the systems and devices described herein, including for example the timestamp acquisition module 500 and the timestamp injection module 600.

FIG. 8 illustrates a method 800 that uses the timing measurements discussed earlier in connection with FIG. 2.

At 810, a sender device updates a packet being transmitted (e.g., packet 205) with a send time, T(pkt-send) and transmits this packet to a receiver device via a forward route. The sender may, in preparing the packet for injection of the send time, mark a metadata descriptor of the packet with a protocol number corresponding to a first protocol in the profile table 620. The packet arrives at a timestamp acquisition module that captures T(pkt-send) and sends it to a metadata bus. The packet then arrives at a timestamp injection module, where the packet is split and T(pkt-send) is injected. The first protocol may, for example, configure the injection module to perform the following:

Pass the first 26 bytes of the packet as is (assuming the timestamp is on bytes 26-29).
Output the metadata timestamp T(pkt-send) as the ALU result.
Replace the next 4 bytes with the ALU result, i.e., T(pkt-send).
Pass the rest of the packet as is.

At 812, the receiver captures a receive time, T(pkt-receive) and extracts T(pkt-send) to compute a forward propagation time, injecting the result back into the packet. The capturing of T(pkt-receive) can be performed in the same manner as T(pkt-send) in step 810, with a timestamp acquisition module that sends T(pkt-receive) to a metadata bus. T(pkt-send) is an embedded timestamp that is extracted, for example, from a packet payload. As the packet traverses through a receive path, a parser unit may select a second protocol in the profile table 620. The second protocol may, for example, configure the injection module to perform, for example, the following:

Pass the first 26 bytes of the packet as is.
Form the ALU result by subtracting the embedded timestamp from the metadata timestamp: T(pkt-receive)-T(pkt-send).
Replace the next 4 bytes with the ALU result, i.e., the forward propagation time.
Pass the rest of the packet as is.

As an alternative to injection of the result into the packet, the forward propagation time may be written to a packet completion descriptor. A completion descriptor is written to a memory of a receiving device each time a packet is received. The completion descriptor summarizes important information about the received packet, such as which protocols were detected in the packet, whether a check sum was computed correctly for the packet, etc. Therefore, it would be reasonable to expand the completion descriptor to include the forward propagation time.

At 814, the receiver updates an acknowledgment packet (e.g., packet 215) with the forward propagation time and T(ack-send) before transmitting the acknowledgment packet to the sender via a backward route. T(ack-send) can be captured by a timestamp acquisition module. The process for injecting T(ack-send) and transmitting the acknowledgment packet is similar to the process for injecting T(pkt-send) and transmitting the original packet. For example, the receiver may mark a metadata descriptor of the acknowledgment packet to indicate a third protocol that configures the injection module to inject T(ack-send) into bytes 26-29 and inject the forward propagation time into another section in the acknowledgment packet, e.g., bytes 30-33.

At 816, the sender captures T(ack-receive) and extracts T(ack-send) to compute a backward propagation time as T(ack-receive)-T(ack-send). The process for computing and injecting the backward propagation time is similar to the process for computing and injecting the forward propagation time. For example, the sender may select a fourth protocol that configures the injection module to compute the backward propagation time and inject the result back into the acknowledgment packet or write the result to a packet completion descriptor.

At 818, the sender extracts the forward propagation time from the acknowledgment packet, for example from a payload section into which the forward propagation time was injected in step 814.

At 820, the sender analyzes the forward and backward propagation times to detect and address congestion. This analysis may be performed by the congestion detection module in the sender. Congestion may be defined based on either of the propagation times exceeding a certain configurable threshold. Alternatively, congestion may be defined based on a sum of the forward and backward propagation times exceeding a configurable threshold. The propagation times can be analyzed by a congestion detection module or other processing unit in the sender. So long as congestion is not detected, the forward and backward routes can be maintained. However, if congestion is detected, the sender can trigger a change in both the backward and forward routes. The route change can be performed by an intermediate node that stores routing information and determines which route to use for sending packets between the sender and receiver.

In one implementation, the sender triggers the route change by sending a follow-up packet that is received by the intermediate node (e.g., a router storing a routing table). The follow-up packet is destined for the receiver and includes header information that the intermediate node uses to determine which route to take in order to transmit the follow-up packet to the receiver. For example, a router receiving the follow-up packet may select the forward and backward routes based on a hash function computed using the following information contained in the header: an identifier of the sender (e.g., a source IP address or other network layer address associated with the source), an identifier of the receiver (e.g., a destination IP address or other network layer address associated with the destination), a destination port, and a source port. Network layer refers to layer 3 of the Open System Interconnect (OSI) Reference Model. The source and destination ports comprise transport layer (OSI layer 4) information, for example a TCP or UDP port.

When the sender determines that a route change should be performed, the sender can change one or more of the hash function inputs. In particular, the sender can change the source port to a different value, thereby changing the hash value. Because the order of the source and destination identifiers, and similarly the order of the source and destination ports, are reversed in the forward and backward directions, the hash value will also be different between the forward route and the backward route. In particular, the source port in the forward direction corresponds to the destination port in the backward direction, and the source address in the forward direction corrections to the destination address in the backward direction. If there are other intermediate nodes that are involved in determining the routes, the hash values computed by these additional intermediate nodes will also change. In this manner, the sender can trigger the route change without sending an explicit request.

Since network devices usually support many port values (e.g., ports that are assigned to specific applications executed by the network device), changing the source port is relatively simple. To route backward flowing traffic back to the same application as before, the sender can simply keep track of source port changes. Thus, from the perspective of the router or other intermediate network device, the follow-up packet appears to transmitted over a new connection between the sender and receiver, from a different sender application than before. The destination identifier and the destination port cannot be changed because the follow-up packet should be transmitted to the same destination as before (i.e., the receiver). In some implementations, the source address could be changed instead of the source port, for example if the sender supports multiple source addresses.

Although FIGS. 8 and 9 are described from the perspective of the sender, the receiver can, when the receiver operates as a sender, also perform the same methods and reach a similar conclusion as to whether network congestion exists. With respect to the method of FIG. 8, in some implementations, the receiver can analyze the forward propagation time to detect and address congestion (e.g., by triggering a route change in the manner discussed above), thereby obviating a need to transmit the forward propagation time to the sender for analysis.

FIG. 9 illustrates a method 900 that uses the timing measurements discussed earlier in connection with FIG. 3. At 910, a sender device updates a packet being transmitted (e.g., packet 205) with a send time, T(pkt-send), and transmits this packet to a receiver device. The process for injecting T(pkt-send) and transmitting the packet is similar to step 810 of method 800. In particular, the sender may, in preparing the packet for injection of the send time, mark a metadata descriptor of the packet with a protocol number corresponding to a first protocol that configures the injection module of the sender to output the metadata timestamp T(pkt-send) as the ALU result, inject T(pkt-send) into a selected location in the packet, and transmit the remaining portions of the packet unmodified.

At 912, the receiver captures T(pkt-receive). The process is similar to step 812 of method 800, and may involve selecting a second protocol, except that instead of computing a forward propagation time, T(pkt-receive) is either injected into the packet as a second timestamp, e.g., in bytes 30-33 of the packet, or T(pkt-receive) is written to a packet completion descriptor.

At 914, the receiver updates an acknowledgment packet by injecting T(ack-send), T(pkt-receive), and T(pkt-send) into selected locations in the acknowledgment packet, for example, in bytes 26-29, 30-33, and 34-36, respectively. In some implementations, it is unnecessary to add T(pkt-send) to the acknowledgment packet if the sender maintains a record of T(pkt-send).

At 916, the receiver computes and injects a receiver internal latency into the acknowledgment packet based on a third protocol which may configure the injection module to perform, for example, the following:

Pass the first 30 bytes of the packet as is (assuming T(pkt-receive) is on bytes 30-33).

Compute, as the ALU result, the receiver internal latency by subtracting the embedded timestamp from the metadata timestamp: T(ack-send)-T(pkt-receive).

Replace the next 4 bytes with the ALU result, thus replacing T(pkt-receive).

Pass the rest of the packet as is.

After completion of step 916, the acknowledgment packet will contain T(ack-send), the receiver internal latency, and T(pkt-send).

At 918, the sender captures T(ack-receive) and injects it into the acknowledgment packet or writes it to a completion descriptor. Step 918 is analogous to step 912 and may be based on a fourth protocol.

At 920, the sender extracts T(pkt-send) to compute a round trip time based on the fourth protocol, which may configure the injection module of the sender to, for example:

Pass the first 33 bytes of the packet as is (assuming T(pkt-send) is on bytes 34-37).

Compute, as the ALU result, a round trip time by subtracting the payload timestamp from the metadata timestamp: T(ack-receive)-T(pkt-send).

Replace the next 4 bytes with the ALU result, thus replacing T(pkt-send).

Pass the rest of the packet as is.

After completion of step 920, the acknowledgment packet will contain T(ack-send), the receiver internal latency, and the round trip time.

At step 922, the sender computes a total propagation time by subtracting the receiver internal latency from the round trip time. This subtraction can be performed in software or hardware, for example by the congestion detection module in the sender. In some implementations, the congestion detection module is the component of the sender that is responsible for changing routes in response to detecting congestion. Additionally, although embodiments have been described in which timing measurements are injected into packets in order to communicate the timing measurements to another device, it is also feasible to transmit time points from which the timing measurements can be determined, rather than directly transmitting the timing measurements. For example, the receiver could, instead of computing and injecting the internal latency in step 916, inject T(pkt-receive) into the acknowledgment packet as an additional timestamp, thereby enabling the sender to compute the internal latency.

At step 924, the sender analyzes the total propagation time to detect and address congestion. The detection may be performed in a similar manner to step 820 in method 800, for example by comparing the total propagation time to a threshold, then triggering a route change (e.g., in the same manner discussed above in connection with FIG. 8) when the total propagation time exceeds the threshold. The total propagation is a metric indicative of congestion somewhere in the forward route or the backward route. Although the total propagation time cannot be used to identify which of the forward route or the backward route is congested, the sender can nevertheless trigger a change to both routes, thereby alleviating congestion.

Figure 10:
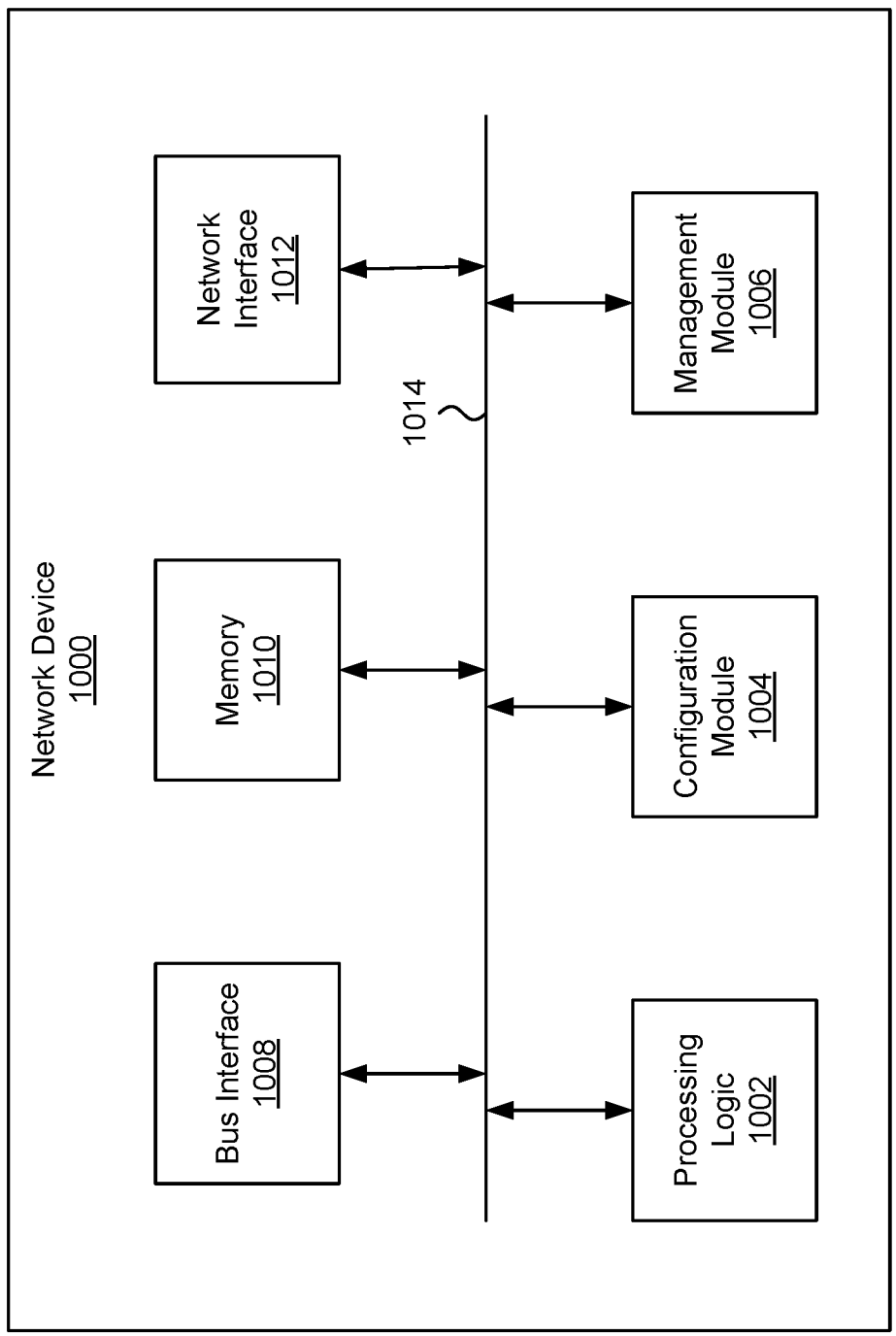
FIG. 10 illustrates an example of a network device, according to certain aspects of the disclosure.

FIG. 10 illustrates an example of a network device 1000. Functionality and/or several components of the network device 1000 may be used without limitation with other embodiments disclosed elsewhere in this disclosure, without limitations. A network device 1000 may facilitate processing of packets and/or forwarding of packets from the network device 1000 to another device. In some implementations, the network device 1000 may be the recipient and/or generator of packets. In some implementations, the network device 1000 may modify the contents of the packet before forwarding the packet to another device. The network device 1000 may be a peripheral device coupled to another computer device, a switch, a router or any other suitable device enabled for receiving and forwarding packets.

In one example, the network device 1000 may include processing logic 1002, a configuration module 1004, a management module 1006, a bus interface module 1008, memory 1010, and a network interface module 1012. These modules may be hardware modules, software modules, or a combination of hardware and software. In certain instances, modules may be interchangeably used with components or engines, without deviating from the scope of the disclosure. The network device 1000 may include additional modules, not illustrated here, such as components discussed with respect to the nodes disclosed in FIG. 11. In some implementations, the network device 1000 may include fewer modules. In some implementations, one or more of the modules may be combined into one module. One or more of the modules may be in communication with each other over a communication channel 1014. The communication channel 1014 may include one or more busses, meshes, matrices, fabrics, a combination of these communication channels, or some other suitable communication channel.

The processing logic 1002 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1002 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as, for example, busses, level 1 (L1) caches, and/or level 2 (L2) caches. The instructions executed by the processing logic 1002 may be stored on a computer-readable storage medium, for example, in the form of a computer program. The computer-readable storage medium may be non-transitory. In some cases, the computer-readable medium may be part of the memory 1010.

The memory 1010 may include either volatile or non-volatile, or both volatile and non-volatile types of memory. The memory 1010 may, for example, include random access memory (RAM), read only memory (ROM), Electrically Erasable Programmable Read-Only Memory (EEPROM), flash memory, and/or some other suitable storage media. In some cases, some or all of the memory 1010 may be internal to the network device 1000, while in other cases some or all of the memory may be external to the network device 1000. The memory 1010 may store an operating system comprising executable instructions that, when executed by the processing logic 1002, provide the execution environment for executing instructions providing networking functionality for the network device 1000. The memory may also store and maintain several data structures and routing tables for facilitating the functionality of the network device 1000.

In some implementations, the configuration module 1004 may include one or more configuration registers. Configuration registers may control the operations of the network device 1000. In some implementations, one or more bits in the configuration register can represent certain capabilities of the network device 1000. Configuration registers may be programmed by instructions executing in the processing logic 1002, and/or by an external entity, such as a host device, an operating system executing on a host device, and/or a remote device. The configuration module 1004 may further include hardware and/or software that control the operations of the network device 1000.

In some implementations, the management module 1006 may be configured to manage different components of the network device 1000. In some cases, the management module 1006 may configure one or more bits in one or more configuration registers at power up, to enable or disable certain capabilities of the network device 1000. In certain implementations, the management module 1006 may use processing resources from the processing logic 1002. In other implementations, the management module 1006 may have processing logic similar to the processing logic 1002, but segmented away or implemented on a different power plane than the processing logic 1002.

The bus interface module 1008 may enable communication with external entities, such as a host device and/or other components in a computing system, over an external communication medium. The bus interface module 1008 may include a physical interface for connecting to a cable, socket, port, or other connection to the external communication medium. The bus interface module 1008 may further include hardware and/or software to manage incoming and outgoing transactions. The bus interface module 1008 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1008 may include the physical layer for any of these bus protocols, including a connector, power management, and error handling, among other things. In some implementations, the network device 1000 may include multiple bus interface modules for communicating with multiple external entities. These multiple bus interface modules may implement the same local bus protocol, different local bus protocols, or a combination of the same and different bus protocols.

The network interface module 1012 may include hardware and/or software for communicating with a network. This network interface module 1012 may, for example, include physical connectors or physical ports for wired connection to a network, and/or antennas for wireless communication to a network. The network interface module 1012 may further include hardware and/or software configured to implement a network protocol stack. The network interface module 1012 may communicate with the network using a network protocol, such as, for example, TCP/IP, Infiniband, RoCE, Institute of Electrical and Electronics Engineers (IEEE) 802.11 wireless protocols, UDP, Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1000 may include multiple network interface modules, each configured to communicate with a different network. For example, in these implementations, the network device 1000 may include a network interface module for communicating with a wired Ethernet network, a wireless 802.11 network, a cellular network, an Infiniband network, etc.

The various components and modules of the network device 1000, described above, may be implemented as discrete components, as an SoC, as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 11.

Figure 11:
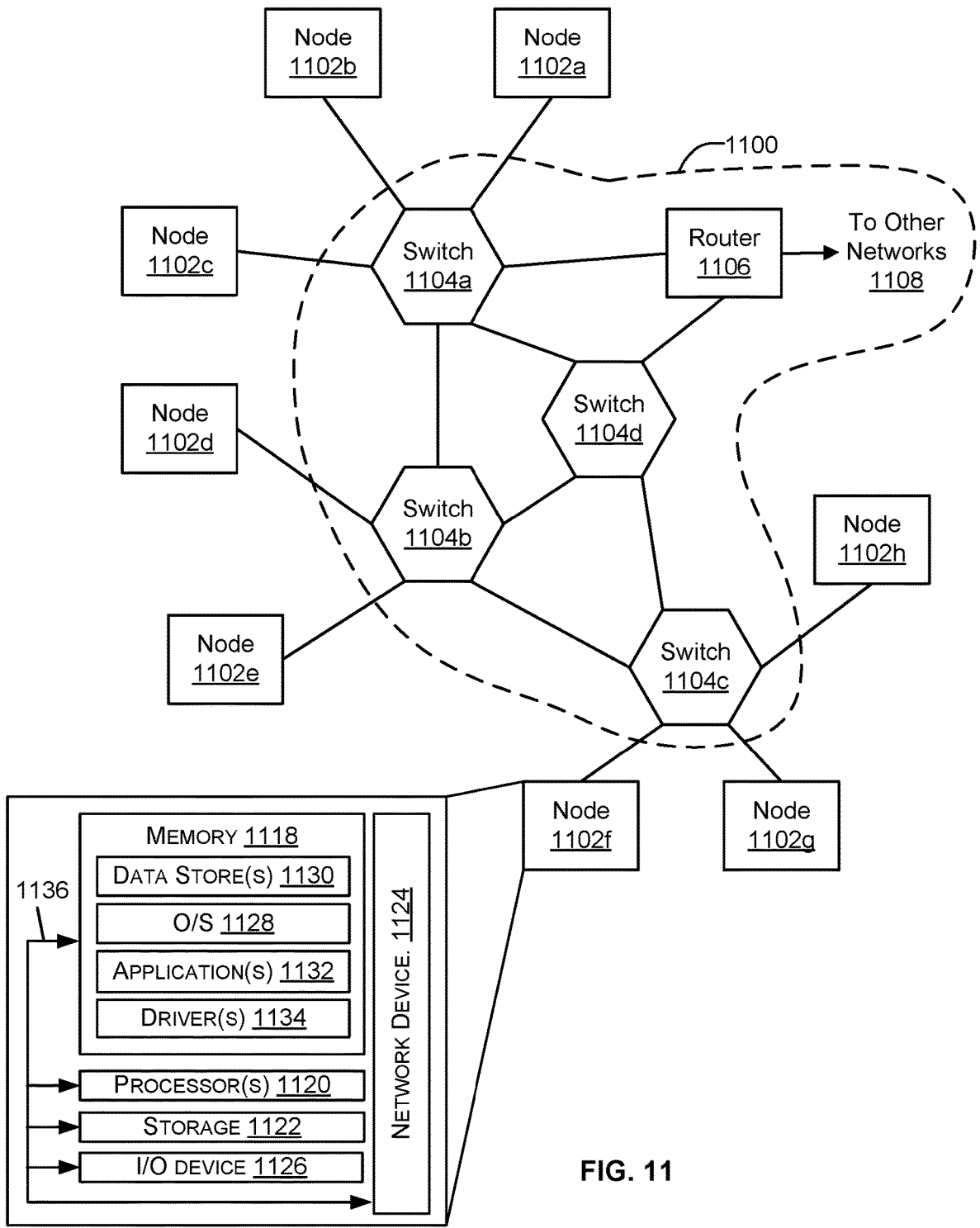
FIG. 11 illustrates an example architecture for features and systems described herein that includes one or more service provider computers and/or a user device connected via one or more networks, according to certain aspects of the disclosure.

FIG. 11 illustrates a network 1100, illustrating various different types of network devices 1000 of FIG. 10, such as nodes comprising the network device, switches and routers. In certain embodiments, the network 1100 may be based on a switched architecture with point-to-point links. As illustrated in FIG. 11, the network 1100 includes a plurality of switches 1104*a*-1104*d*, which may be arranged in a network. In some cases, the switches are arranged in a multi-layered network, such as a Clos network. A network device 1000 that filters and forwards packets between local area network (LAN) segments may be referred to as a switch. Switches generally operate at the data link layer (layer 2) and sometimes the network layer (layer 3) of the OSI Reference Model and may support several packet protocols. Switches 1104*a*-1104*d* may be connected to a plurality of nodes 1102*a*-1102*h* and provide multiple paths between any two nodes.

The network 1100 may also include one or more network devices 1000 for connection with other networks 1108, such as other subnets, LANs, wide area networks (WANs), or the Internet, and may be referred to as routers 1106. Routers use headers and forwarding tables to determine the best path for forwarding the packets, and use protocols such as internet control message protocol (ICMP) to communicate with each other and configure the best route between any two devices.

In some examples, network(s) 1100 may include any one or a combination of many different types of networks, such as cable networks, the Internet, wireless networks, cellular networks and other private and/or public networks. Interconnected switches 1104*a*-1104*d* and router 1106, if present, may be referred to as a switch fabric, a fabric, a network fabric, or simply a network. In the context of a computer network, terms "fabric" and "network" may be used interchangeably herein.

Nodes 1102*a*-1102*h* may be any combination of host systems, processor nodes, storage subsystems, and I/O chassis that represent user devices, service provider computers or third party computers.

User devices may include computing devices to access an application 1132 (e.g., a web browser or mobile device application). In some aspects, the application 1132 may be hosted, managed, and/or provided by a computing resources service or service provider. The application 1132 may allow the user(s) to interact with the service provider computer(s) to, for example, access web content (e.g., web pages, music, video, etc.). The user device(s) may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1108. Additionally, the user device(s) may be part of the distributed system managed by, controlled by, or otherwise part of the service provider computer(s) (e.g., a console device integrated with the service provider computers).

The node(s) of FIG. 11 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1132 and/or cloud-based software services. These servers may be configured as part of an integrated, distributed computing environment. In some aspects, the service provider computer(s) may, additionally or alternatively, include computing devices such as, for example, a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1102a-1102h may include at least one memory 1118 and one or more processing units (or processor(s) 1120). The processor(s) 1120 may be implemented in hardware, computer-executable instructions, firmware, or combinations thereof. Computer-executable instruction or firmware implementations of the processor(s) 1120 may include computer-executable or machine-executable instructions written in any suitable programming language to perform the various functions described.

In some instances, the hardware processor(s) 1120 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1118 may store program instructions that are loadable and executable on the processor(s) 1120, as well as data generated during the execution of these programs. Depending on the configuration and type of the node(s) 1102a-1102h, the memory 1118 may be volatile (such as RAM) and/or non-volatile (such as ROM, flash memory, etc.). The memory 1118 may include an operating system 1128, one or more data stores 1130, one or more application programs 1132, one or more drivers 1134, and/or services for implementing the features disclosed herein.

The operating system 1128 may support nodes 1102a-1102h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1128 may also be a proprietary operating system.

The data stores 1130 may include permanent or transitory data used and/or operated on by the operating system 1128, application programs 1132, or drivers 1134. Examples of such data include web pages, video data, audio data, images, user data, and so on. The information in the data stores 1130 may, in some implementations, be provided over the network(s) 1108 to user devices 1104. In some cases, the data stores 1130 may additionally or alternatively include stored application programs and/or drivers. Alternatively or additionally, the data stores 1130 may store standard and/or proprietary software libraries, and/or standard and/or proprietary application user interface (API) libraries. Information stored in the data stores 1130 may be machine-readable object code, source code, interpreted code, or intermediate code.

The drivers 1134 include programs that may provide communication between components in a node. For example, some drivers 1134 may provide communication between the operating system 1128 and additional storage 1122, network device 1124, and/or I/O device 1126. Alternatively or additionally, some drivers 1134 may provide communication between application programs 1132 and the operating system 1128, and/or application programs 1132 and peripheral devices accessible to the service provider computer. In many cases, the drivers 1134 may include drivers that provide well-understood functionality (e.g., printer drivers, display drivers, hard disk drivers, Solid State Device drivers). In other cases, the drivers 1134 may provide proprietary or specialized functionality.

The service provider computer(s) or servers may also include additional storage 1122, which may include removable storage and/or non-removable storage. The additional storage 1122 may include magnetic storage, optical disks, solid state disks, flash memory, and/or tape storage. The additional storage 1122 may be housed in the same chassis as the node(s) 1102a-1102h or may be in an external enclosure. The memory 1118 and/or additional storage 1122 and their associated computer-readable media may provide non-volatile storage of computer-readable instructions, data structures, program modules, and other data for the computing devices. In some implementations, the memory 1118 may include multiple different types of memory, such as SRAM, DRAM, or ROM.

The memory 1118 and the additional storage 1122, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1118 and the additional storage 1122 are examples of computer storage media. Additional types of computer storage media that may be present in the node(s) 1102a-1102h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1102a-1102h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1102a-1102h may also include I/O device(s) 1126, such as a keyboard, a mouse, a pen, a voice input device, a touch input device, a display, speakers, a printer, and the like. The node(s) 1102a-1102h may also include one or more communication channels 1136. A communication channel 1136 may provide a medium over which the various components of the node(s) 1102a-1102h can communicate. The communication channel or channels 1136 may take the form of a bus, a ring, a switching fabric, or a network.

The node(s) 1102a-1102h may also contain network device(s) 1124 that allow the node(s) 1102a-1102h to communicate with a stored database, another computing device or server, user terminals and/or other devices on the network(s) 1100. The network device(s) 1124 of FIG. 11 may include similar components discussed with reference to the network device 1000 of FIG. 10.

In some implementations, the network device 1124 is a peripheral device, such as a PCI-based device. In these implementations, the network device 1124 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1008 may implement NVMe, and the network device 1124 may be connected to a computing system using a PCIe interface.

A PCI-based device may include one or more functions. A "function" describes operations that may be provided by the network device 1124. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1124 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as, for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 10, FIG. 11, and/or functions described herein can be provided by one or more modules that exist as separate modules and/or module functions described herein can be spread over multiple modules.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method, comprising:
    capturing, by a timestamp acquisition circuit of a network interface controller in a first network device, a send time of a first outgoing packet being sent from the first network device through a forward route to a second network device, wherein the timestamp acquisition circuit captures time using a local clock of the first network device;
    receiving, by the network interface controller and through a backward route different from the forward route, a first acknowledgment packet from the second network device, the first acknowledgment packet acknowledging the first outgoing packet and containing first timing information for determining an internal latency of the second network device, wherein the first timing information is generated using a receive time of the first outgoing packet and a send time of the first acknowledgment packet, and wherein the receive time of the first outgoing packet and the send time of the first acknowledgement packet are captured according to a local clock of the second network device;
    capturing, by the timestamp acquisition circuit, a receive time of the first acknowledgment packet;
    computing, by the network interface controller, a first round trip time as a difference between the send time of the first outgoing packet and the receive time of the first acknowledgment packet;
    subtracting, by the network interface controller, the internal latency determined using the first timing information from the first round trip time to compute a first total propagation time for the forward route and the backward route;
    responsive to detecting that the first total propagation time is below a threshold, sending, by the network interface controller, a second outgoing packet through the forward route to the second network device;
    capturing, by the timestamp acquisition circuit, a send time of the second outgoing packet;
    receiving, by the network interface controller and through the backward route, a second acknowledgment packet from the second network device, the second acknowledgment packet acknowledging the second outgoing packet and containing second timing information for determining the internal latency of the second network device;
    capturing, by the timestamp acquisition circuit, a receive time of the second acknowledgment packet;
    computing, by the network interface controller, a second round trip time as a difference between the send time of the second outgoing packet and the receive time of the second acknowledgment packet;
    subtracting, by the network interface controller, the internal latency determined using the second timing information from the second round trip time to compute a second total propagation time for the forward route and the backward route;
    responsive to detecting that the second total propagation time is above the threshold, triggering, by the network interface controller, a change in both the forward route and the backward route by transmitting a follow-up packet destined for the second network device, the follow-up packet being received by a router that determines the forward route and the backward route based on header information, wherein header information in the follow-up packet is selected by the network interface controller to be different than header information in the second outgoing packet.

2. The computer-implemented method of claim 1, wherein the router determines the forward route and the backward route by computing a hash function using the following items of header information included in a header of the follow-up packet: a network layer address associated with the first network device, a network layer address associated with the second network device, a transport layer port associated with the first network device, and a transport layer port associated with the second network device.

3. A computer-implemented method, comprising:
    capturing, using a local clock of a first network device, a send time of an outgoing packet being sent from the first network device through a forward route to a second network device;
    receiving, by the first network device and through a backward route, an acknowledgment packet from the second network device, the acknowledgment packet acknowledging the outgoing packet and containing timing information for determining an internal latency of the second network device, wherein the timing information was generated using a local clock of the second network device;
    capturing, using the local clock of the first network device, a receive time of the acknowledgment packet;
    computing, by the first network device, a round trip time as a difference between the send time of the outgoing packet and the receive time of the acknowledgment packet;
    subtracting, by the first network device, the internal latency from the round trip time to compute a total propagation time for the forward route and the backward route; and
    responsive to detecting that the total propagation time is above a threshold, triggering, by the first network device, a change in both the forward route and the backward route, for transmission of subsequent packets between the first network device and the second network device.

4. The computer-implemented method of claim 3, further comprising:
updating the outgoing packet with the send time of the outgoing packet; and
extracting the send time of the outgoing packet from the acknowledgment packet for use in the computing of the round trip time.

5. The computer-implemented method of claim 3, further comprising:
extracting the receive time of the acknowledgment packet from a completion descriptor of the acknowledgement packet, for use in the computing of the round trip time.

6. The computer-implemented method of claim 3, further comprising:
extracting the internal latency of the second network device from the acknowledgment packet for use in the computing of the total propagation time.

7. The computer-implemented method of claim 3, further comprising:
encrypting the outgoing packet after updating the outgoing packet with the send time of the outgoing packet; and
decrypting the acknowledgment packet before updating the acknowledgment packet with the receive time of the acknowledgment packet.

8. The computer-implemented method of claim 3, wherein the local clock of the first network device and the local clock of the second network device are not synchronized to each other.

9. The computer-implemented method of claim 8, wherein the local clock of the first network device operates at a different frequency than the local clock of the second network device.

10. A computer-implemented method, comprising:
capturing, using a local clock of a first network device, a receive time of a first incoming packet sent from a second network device through a forward route;
sending, by the first network device, an acknowledgment packet through a backward route to the second network device in response to receiving the first incoming packet;
capturing, using the local clock of the first network device, a send time of the acknowledgment packet;
computing an internal latency of the first network device as a difference between the receive time of the first incoming packet and the send time of the acknowledgment packet;
updating, by the first network device, the acknowledgment packet with timing information for determining a total propagation time of the forward route and the backward route based on the internal latency; and
receiving, by the first network device, a second incoming packet through a different forward route, the second incoming packet being sent through the different forward route based on a change in header information of the second incoming packet relative to header information of the first incoming packet, wherein the header information of the first incoming packet and the header information of the second incoming packet are determined by the second network device.

11. The computer-implemented method of claim 10, further comprising:
extracting a send time of the first incoming packet, wherein the send time of the first incoming packet was determined using a local clock of the second network device; and
updating, by the first network device, the acknowledgment packet with the send time of the first incoming packet.

12. The computer-implemented method of claim 11, wherein the local clock of the first network device and the local clock of the second network device are not synchronized to each other.

13. The computer-implemented method of claim 10, further comprising:
replacing, by the first network device, a portion of the acknowledgment packet corresponding to the receive time of the first incoming packet with the internal latency.

14. The computer-implemented method of claim 10, wherein after sending the acknowledgment packet, the forward route and the backward route are changed for transmission of subsequent packets between the first network device and the second network device, based on detection of congestion at the second network device using the total propagation time, the subsequent packets including the second incoming packet.

15. The computer-implemented method of claim 14, wherein the forward route and the backward route are changed in response to network congestion detected using the timing information in the acknowledgment packet.

16. The computer-implemented method of claim 10, further comprising:
decrypting the first incoming packet before updating the first incoming packet with the receive time of the first incoming packet; and
encrypting the acknowledgment packet after updating the acknowledgment packet with the send time of the acknowledgment packet.

17. An apparatus, comprising:
a transceiver operable to:
transmit an outgoing packet to a receiver device through a forward route, and
receive an acknowledgment packet from the receiver device through a backward route, the acknowledgment packet acknowledging the outgoing packet and containing timing information for determining an internal latency of the receiver device, wherein the timing information was generated using a local clock of the receiver device;
a timestamp acquisition circuit operable to:
capture, using a local clock of the apparatus, a send time of the outgoing packet, and
capture, using the local clock of the apparatus, a receive time of the acknowledgment packet; and
a congestion detection circuit operable to:
compute a round trip time as a difference between the send time of the outgoing packet and the receive time of the acknowledgment packet,
subtract the internal latency from the round trip time to compute a total propagation time for the forward route and the backward route, and
responsive to detecting that the total propagation time is above a threshold, change the forward route and the backward route, for transmission of subsequent packets between the apparatus and the receiver device.

18. The apparatus of claim 17, further comprising:
a timestamp injection circuit operable to:
inject the send time of the outgoing packet into the outgoing packet, and
inject the receive time of the acknowledgment packet into the acknowledgment packet.

19. The apparatus of claim 17, wherein the congestion detection circuit changes the forward route and the backward route by causing the apparatus to transmit a follow-up packet destined for the receiver device, the follow-up packet being received by a router that determines the forward route and the backward route based on header information in the follow-up packet.

20. The apparatus of claim 17, wherein the timing information is generated using a receive time of the outgoing packet and a send time of the acknowledgment packet, and wherein the receive time of the outgoing packet and the send time of the acknowledgement packet are captured according to the local clock of the receiver device.

* * * * *